No. 880,395. PATENTED FEB. 25, 1908.
R. E. NOBLE.
TROLLEY WHEEL SPRING.
APPLICATION FILED JULY 3, 1907.

Witnesses:

Inventor,
Ralph E. Noble
By Glenn S. Noble
Att'y.

UNITED STATES PATENT OFFICE.

RALPH E. NOBLE, OF CHICAGO, ILLINOIS, ASSIGNOR TO MORGAN-GARDNER ELECTRIC COMPANY, OF CHICAGO, ILLINOIS.

TROLLEY-WHEEL SPRING.

No. 880,395.

Specification of Letters Patent.

Patented Feb. 25, 1908.

Original application filed January 13, 1905, Serial No. 240,963. Divided and this application filed July 3, 1907. Serial No. 382,011.

*To all whom it may concern:*

Be it known that I, RALPH E. NOBLE, a citizen of the United States, residing at Chicago, in the county of Cook and State of Illinois, have invented certain new and useful Improvements in Trolley-Wheel Springs, of which the following is a specification.

This invention relates more particularly to springs, used in connection with electric trolley wheels and their supporting harps or forks to maintain the wheel in a central position, or to conduct electricity from the wheel to the harp.

The invention consists more particularly in an improved spring and in the combination of such spring with the trolley wheel and harp. Its objects are to provide a simple, economical and efficient device for the purpose specified, which may be readily inserted in position and will be positive in operation, and which will have such other advantages as will be pointed out hereinafter.

Figure 1:
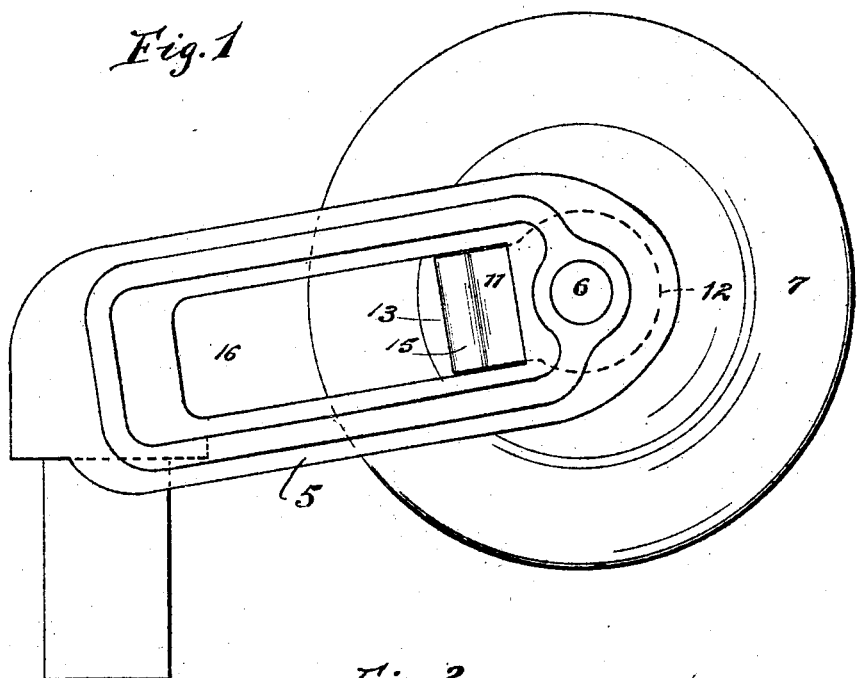
Figure 2:
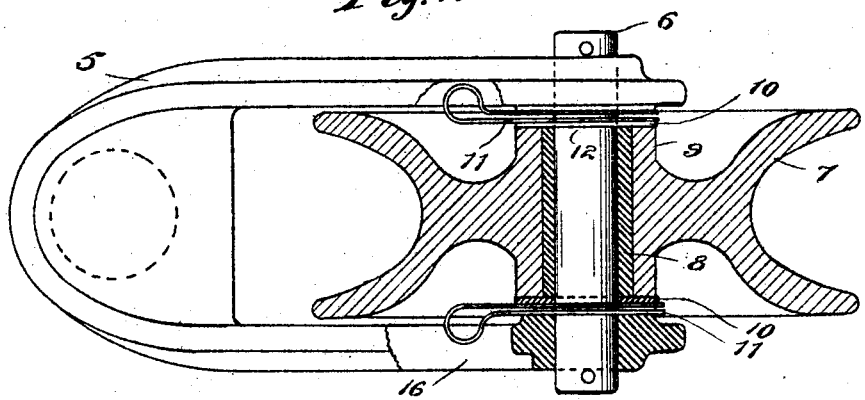
Figures 3, 4:
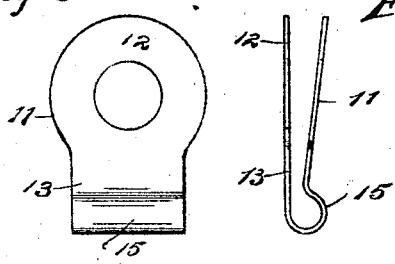

I have shown my improved device in the accompanying drawings in which;

Figure 1 represents a side view of the trolley wheel and harp, which may be of any ordinary or preferred form of construction, provided with springs according to this invention. Fig. 2 is a top plan view of the same with parts broken away or shown in section for convenience in illustration. Fig. 3 is a side view of the preferred form of spring, and Fig. 4 is an edge view of the same.

The trolley harp or fork 5 is provided with an ordinary shaft or pin 6 which carries a trolley or trolley wheel 7, which may be provided with a bushing or lubricating sleeve 8. At either end of the hub or central portion 9 of the wheel 8, is a washer 10, preferably made of copper or other suitable conducting material. While these washers might be dispensed with, yet, I have found them of advantage in actual practice. Springs 11 are inserted between the ends of the hub, and the harp as shown particularly in Figs. 1 and 2. These springs consist of two annuli or washers or disks 12 which are connected by means of an integrally formed folded strip or tongue 13. This spring is constructed so that the annular portions will normally extend at some distance apart, as shown in Fig. 4, so that when pressed together, they will exert an outward or longitudinal tension against the end of the hub and the inner side of the harp adjacent to the bearing for the pin. These springs 11 are inserted, as shown in Fig. 2, between the washers 10 and the inner sides of the harp arms. The loop or end 15 where the spring 11 is folded, may be formed in any desired manner, but I prefer to have it formed as shown, so that it will lie upon one side of the folded spring. The projections may then be turned so as to enter a slot or opening 16 in the fork arms. When inserted in this position, the spring is prevented from turning with the trolley wheel, the washer 10 taking up the wear between the wheel and the spring.

Ordinarily, a small amount of lubricating material will pass out around the washer so that the friction between the spring and the washer will be very slight. It will be noted that these springs do not need to be fastened either to the harp or to the wheel and therefore are easily put in place, and are more positive in action and adjust themselves with greater precision than springs which are rigidly secured to the wheel or the harp. These springs are located in such a position that they are effectually protected, and are not subject to electrical injury occasioned by trolley or harp striking against the line wire or supports, or other obstructions, and will not be injured by any arcs formed between the trolley or the harp and the main conductor. These springs may be readily stamped or formed from any suitable spring or resilient material, such as spring brass or the like, and are then bent up as shown in Fig. 4 for insertion in position. Although the form shown with the somewhat reduced connecting strip or portion 13 is a convenient and desirable one, I do not wish to limit myself to any particular form, as the spring may be formed of any suitable strip with the ends punched out or with one end punched and the other slotted in any ordinary manner; and it will also be noted that the form or portion which projects into the slot of the harp may be made in any desired manner without departing fom the spirit of this invention.

Having thus described my invention, what I claim and desire to secure by Letters Patent is:—

1. The combination with the trolley wheel and axle, of a harp provided with arms having openings or recesses therein, centralizing springs interposed between the hub of said wheel and said arms; said springs being formed of a folded piece of spring metal and having projecting loops extending into the apertures in said arms.

2. The combination with a trolley harp and wheel of folded springs between the wheel and harp, said springs being provided with projections engaging with said harp but not attached thereto.

3. The combination with a trolley harp having openings or recesses in the sides thereof, of a trolley wheel, and folded springs inserted between the sides of the wheel and the ends of the harp, said springs being bent to enter into the openings in the harp.

4. In a device of the character set forth, the combination with a forked trolley wheel support, an axle having bearings in said support, a wheel mounted on said axle, washers at the ends of the hub of said wheel, and flat folded springs between the said washers and the ends of the forked arms, said springs having projections adapted to eng ge loosely with said arms 5. A spring for trolleys, comprising a bent strip of suitable metal having projection formed at one side adapted to engage with the trolley harp, and having holes in the free ends for engagement with the axle of the trolley.

6. The combination with a trolley-harp and its wheel, of V-shaped contact-springs loosely interposed between the wheel and the arms of the harp, the end of said spring having outwardly-extending portions passing through openings in the arms of the harp to prevent the rotation thereof with the wheel.

7. The combination with a trolley-harp and its wheel, V-shaped contact-springs loosely interposed between the wheel and the arms of the harp, the shaft of the wheel passing through the upper ends of the springs, the lower ends of the said springs having outwardly-extending looped portions passing through openings in the arms of the harp.

RALPH E. NOBLE.

Witnesses:
E. J. Goss,
B. Mac Brair.